United States Patent
Bossert et al.

(10) Patent No.: US 12,305,744 B2
(45) Date of Patent: May 20, 2025

(54) ADAPTER SERIES FOR GEARED MOTORS, AND METHOD FOR PRODUCING AN ADAPTER

(71) Applicant: SEW-EURODRIVE GMBH & CO. KG, Bruchsal (DE)

(72) Inventors: Philipp Bossert, Karlsbad (DE); Michael Basiewicz, Gondelsheim (DE); Billy Parris, Moore, SC (US); Jürgen Kasper, Lingenfeld (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/293,061

(22) PCT Filed: Jun. 27, 2022

(86) PCT No.: PCT/EP2022/025291
§ 371 (c)(1),
(2) Date: Jan. 29, 2024

(87) PCT Pub. No.: WO2023/006239
PCT Pub. Date: Feb. 2, 2023

(65) Prior Publication Data
US 2024/0344603 A1    Oct. 17, 2024

Related U.S. Application Data

(60) Provisional application No. 63/226,385, filed on Jul. 28, 2021.

(30) Foreign Application Priority Data

Sep. 6, 2021   (DE) .......................... 102021004494.0

(51) Int. Cl.
*F16H 57/033*    (2012.01)
*F16H 57/023*    (2012.01)
(Continued)

(52) U.S. Cl.
CPC .......... *F16H 57/033* (2013.01); *F16H 57/023* (2013.01); *F16H 57/028* (2013.01); *F16H 2057/02034* (2013.01)

(58) Field of Classification Search
CPC .... F16H 57/033; F16H 57/023; F16H 57/028; F16H 2057/02034; H02K 7/003; F16D 2001/103
See application file for complete search history.

(56) References Cited

U.S. PATENT DOCUMENTS 3,959,990 A * 6/1976 Golitz .................... H02K 7/116
464/83
6,328,655 B1 * 12/2001 Zimmermann ....... F16H 57/025
464/178
(Continued)

FOREIGN PATENT DOCUMENTS

CN     104040847 A *  9/2014 ........... F16D 1/0876
DE     10123548 A1    12/2001
(Continued)

OTHER PUBLICATIONS

International Report on Patentability issued in corresponding International Application No. PCT/EP2022/0025291 dated Jan. 18, 2024, pp. 1-12, English Translation.

(Continued)

*Primary Examiner* — Thomas C Diaz
(74) *Attorney, Agent, or Firm* — Carter, DeLuca & Farrell LLP

(57) ABSTRACT

In an adapter series for geared motors, and a method for producing an adapter from a modular system, which include a first housing part, a second housing part, an intermediate flange, and a first bearing, a first adapter or a second adapter is selectively produced. To produce the first adapter, the first housing part is directly connected to the second housing part, and the outer ring of the first bearing is accommodated (Continued)

in the first and second housing parts and centers the first housing part with respect to the second housing part. To produce the second adapter, the first housing part is connected directly to the intermediate flange, the intermediate flange is connected directly to the second housing part on the side thereof facing away from the first housing part, and the outer ring of the first bearing is accommodated in the first housing part and in the intermediate flange and centers the first housing part with respect to the intermediate flange.

27 Claims, 13 Drawing Sheets

(51) Int. Cl.
*F16H 57/028* (2012.01)
*F16H 57/02* (2012.01)

(56) References Cited

U.S. PATENT DOCUMENTS

| | | | |
|---|---|---|---|
| 7,387,574 B2* | 6/2008 | Zimmermann | ......... F16D 7/04 |
| | | | 464/73 |
| 2003/0176222 A1 | 9/2003 | Zimmermann | |
| 2006/0096412 A1 | 5/2006 | Wittenstein | |

FOREIGN PATENT DOCUMENTS

| | | |
|---|---|---|
| WO | 2002/021895 A2 | 3/2002 |
| WO | 2019/141342 A1 | 7/2019 |

OTHER PUBLICATIONS

International Search Report issued in corresponding International Application No. PCT/EP2022/025291 dated Sep. 29, 2022, pp. 1-2, English Translation.

* cited by examiner

ADAPTER SERIES FOR GEARED MOTORS, AND METHOD FOR PRODUCING AN ADAPTER

CROSS-REFERENCE TO RELATED APPLICATIONS

The present application is the national stage of PCT International Patent Application No. PCT/EP2022/025291, filed on Jun. 27, 2022, which claims the benefit of and priority to U.S. Provisional Application No. 63/226,385, filed on Jul. 28, 2021, and which claims priority to German Patent Application No. 10 2021 004 494.0, filed on Sep. 6, 2021, each of which is expressly incorporated herein in its entirety by reference thereto.

FIELD OF THE INVENTION

The present invention relates to an adapter series for geared motors, and a method for producing an adapter.

BACKGROUND INFORMATION

In certain conventional systems, a geared motor has an electric drive which drives a transmission.

Page 4 of https://www.stieberclutch.com/de-DE/~/media/ 7807A87DF09B4FE289D2C9A6FC552153.ashx describes a freewheel, e.g., a clamping body freewheel having an inner ring and an outer ring as well as other components such as clamping bodies.

A planetary transmission is described in German Patent Document No. 101 23 548.

A series of adapter devices is described in PCT Patent Document No. WO 02/021895.

SUMMARY

Example embodiments of the present invention provide for various applications of a geared motor with little effort.

According to an example embodiment, an adapter series for geared motors includes a first adapter and a second adapter. The first adapter has an adapter shaft, a first bearing, and a housing having a first and a second housing part. The first housing part is connected, e.g., directly connected, to the second housing part, e.g., to form the housing, the inner ring of the first bearing is fitted onto the adapter shaft, and the outer ring of the first bearing is accommodated in the first and second housing part and centers the first housing part with respect to the second housing part. The second adapter has a second adapter shaft, a first bearing, which is identical to the first bearing, and a second housing, which has a first housing part, which is identical to the first housing part, a second housing part, which is identical to the second housing part, and an intermediate flange. The first housing part of the second adapter is connected, e.g., directly connected, to the intermediate flange, and the intermediate flange is connected, e.g., directly connected, on the side thereof facing away from the first housing part, e.g., in the axial direction, i.e., in the direction of the axis of rotation of the second adapter shaft, to the second housing part, e.g., to form the housing. The inner ring of the first bearing of the second adapter is fitted onto the adapter shaft, the outer ring of the first bearing of the second adapter is accommodated in the first housing part and in the intermediate flange and centers the first housing part with respect to the intermediate flange, and a shaft seal ring or a freewheel is accommodated in the intermediate flange or is integrated in the intermediate flange.

Thus, through the optional insertion of the intermediate flange an additional aspect, such as improved sealing via a shaft seal ring or freewheel, can be achieved without any special additional effort. Thus, the optimum solution can always be produced for different geared motor applications. For example, the first adapter is very compact and the second adapter is provided with the additional feature.

According to example embodiments, the second housing part has through bores, e.g., throughgoing bores, radially throughgoing bores, etc. The through bores are spaced apart from each other in the circumferential direction, e.g., evenly. For example, the through bores are all arranged at the same axial position. For example, the respective through bore is closed with a respective sealing plug. For example, at a respective angular position of the adapter shaft, the bore axis of each through bore can be brought into alignment with the screw axis of a clamping screw of a clamping ring of the first or second adapter, which clamping ring can be connected to the adapter shaft in a rotationally fixed manner. Thus, with a motor-side clamping connection, actuation can be carried out readily in that a tool can be inserted through the through bores. But even without the clamping connection, for example, if a key connection, e.g., a stepped key connection, is used, the second housing part can be used, i.e., no other housing part is necessary.

According to example embodiments, in the first adapter the outer ring of the first bearing is accommodated on the one hand in a bore of the first housing part and on the other hand in a bore of the second housing part. The sum of the bore depths of the two bores equals the axial length of the outer ring, and in the second adapter, the outer ring of the first bearing is accommodated on the one hand in a bore of the first housing part and on the other hand in a bore of the intermediate flange. In the second adapter, the sum of the bore depths of the two bores equals the axial length of the outer ring or equals the sum of the axial lengths of the outer ring of the first bearing and the outer ring of the freewheel.

According to example embodiments, the first adapter has a clutch part, the adapter shaft has dogs, e.g., dogs projecting in the axial direction, and the inner ring of the first bearing is fitted onto a bearing seat, e.g., a finely machined bearing seat, provided on the adapter shaft. The bearing seat covers, in the axial direction, a first region in which the bearing seat is uninterrupted in the circumferential direction, and a second region in which the bearing seat is interrupted in the circumferential direction, e.g., at a plurality of points.

According to example embodiments, the adapter is provided, e.g., for a geared motor, including an adapter shaft, a clutch part, and a bearing, e.g., a rolling bearing. The adapter part has dogs, e.g., dogs projecting in the axial direction. The inner ring of the bearing is fitted onto a bearing seat, e.g., a finely machined bearing seat, provided on the adapter shaft. The bearing seat covers, in the axial direction, a first region in which the bearing seat is uninterrupted in the circumferential direction, and a second region in which the bearing seat is interrupted in the circumferential direction, e.g., at a plurality of points.

Thus, the adapter has a very compact configuration. However, an interrupted bearing seat is provided. Since the interrupted bearing seat is arranged in the dog region, however, and the dogs are very rigid because a high torque has to be transmitted, the bearing is accommodated with sufficient stability.

According to example embodiments, a damping part is arranged between the dogs of the clutch part and the dogs of the adapter shaft. For example, the damping part has a base body and beam regions formed thereon which project in the radial direction. The beam regions are arranged axially between respectively one dog of the clutch part and one of the adapter part. Thus, the torque transmission is play-free, and torque fluctuations can be damped.

According to example embodiments, a circumferential cutout, e.g., a recess, is arranged on the adapter shaft in the axial direction between the first region and the second region. Thus, although the bearing seat is also interrupted at this point, bulges of the adapter shaft in the region of the cutout are at a distance from the inner ring of the bearing. The bulges are caused when the dogs are deflected elastically, e.g., when torque shocks are to be transmitted.

According to example embodiments, the region covered by the dogs in the axial direction includes the second region and is at a distance from the first region in the axial direction. Thus, the bearing seat has both regions, and the dogs are at a distance from the uninterrupted region. This stable region is thus decoupled from the elastically deflectable dogs.

For example, the axial direction is aligned parallel to the axis of rotation of the adapter shaft, e.g., the circumferential direction and/or the radial distance is or are relative to this axis of rotation.

According to example embodiments, the inner ring is axially delimited on both sides by retaining rings. Thus, the first bearing is arranged as a fixed bearing.

According to example embodiments, a first retaining ring is accommodated in a first annular groove, e.g., a first annular groove which extends completely and/or uninterruptedly in the circumferential direction, of the adapter shaft and delimits the inner ring. The first annular groove is at a distance from the first region and/or from the dogs in the axial direction. Thus, the first retaining ring is accommodated in a stable, uninterrupted annular groove. However, the second retaining ring is accommodated in an interrupted annular groove, i.e., in an annular groove made through in the dogs.

According to example embodiments, a second retaining ring delimits the inner ring, e.g., on the side of the inner ring facing away from the first retaining ring in the axial direction. The second retaining ring is accommodated in a second annular groove. Thus, the inner ring of the bearing is delimited, even if the delimitation is arranged in the seat region, which is interrupted at a plurality of points in the circumferential direction. This results in a particularly compact configuration.

According to example embodiments, the second annular groove is interrupted in the circumferential direction, e.g., at a plurality of points, and/or the second annular groove is arranged in the second region. Thus, the adapter has a very compact configuration, as the inner ring of the bearing partially projects axially into the region of the dogs.

According to example embodiments, the second annular groove is made in the dogs of the adapter part and/or in the dogs of the clutch part. Thus, the retaining ring is securely accommodated in the axial direction.

According to example embodiments, the second annular groove is uninterrupted in the circumferential direction and is made in the clutch part. Thus, the axial securing is not made possible directly in the adapter shaft, but in another part, namely in the clutch part. Thus, the inner ring even projects partially over the dog region of the clutch part. This means that the adapter can be built very compactly.

According to example embodiments, the adapter has a housing which has a first and a second housing part. The first housing part is connected to the second housing part, and the outer ring of the bearing is accommodated in the first and second housing part and centers the first with respect to the second housing part. Thus, the outer ring centers the two housing parts with respect to each other. The bearing thus additionally is arranged as a centering device.

According to example embodiments, the bearing is arranged as a fixed bearing. Thus, the bearing is axially fixed.

According to example embodiments, the adapter has a second bearing, e.g., a bearing arranged as a non-locating bearing, the outer ring of which is accommodated in the first housing part and the inner ring of which is fitted onto the adapter shaft. For example, a shaft seal ring is accommodated in the first housing part, e.g., on the side of the second bearing facing away from the clutch part, which seal ring seals towards the adapter shaft, e.g., the seal lip of the seal ring engages on the adapter shaft.

Thus, the distance between the fixed bearing and the non-locating bearing is variable in the event of thermally induced changes in length, because the non-locating bearing is displaceable in the axial direction, e.g., slightly displaceable.

According to example embodiments, a geared motor includes an adapter, an electric motor, and a transmission. A rotor shaft is rotationally fixed to the clutch part, e.g., via a key connection. The adapter shaft is rotationally fixed to a driving toothing part of the transmission or is arranged in one piece, e.g., in one part, therewith. Thus, the geared motor can be configured as compact as possible.

According to example embodiments, a geared motor includes an adapter, and the adapter has an adapter shaft, a first bearing, and a first housing part. An electric motor of the geared motor has a second housing part. The first housing part is connected, e.g., directly connected, to the second housing part, the inner ring of the first bearing is fitted onto the adapter shaft, the outer ring of the first bearing is accommodated in the first and second housing part and centers the first housing part with respect to the second housing part, the adapter has a clutch part, and the adapter shaft has dogs, e.g., dogs projecting in the axial direction. The inner ring of the first bearing is fitted onto a bearing seat, e.g., a finely machined bearing seat, provided on the adapter shaft, and the bearing seat covers, in the axial direction, a first region in which the bearing seat is uninterrupted in the circumferential direction, and a second region in which the bearing seat is interrupted in the circumferential direction, e.g., at a plurality of points. The geared motor has an electric motor and a transmission, and a rotor shaft is rotationally fixed to the clutch part, e.g., via a key connection. The adapter shaft is rotationally fixed to a driving toothing part of the transmission or is arranged in one piece, e.g., in one part, therewith. For example, a stepped key connects the rotor shaft to the clutch part in a form-fitting and/or rotationally fixed manner in the circumferential direction. For example, the stepped key has an outer collar projecting radially outwards, which delimits the clutch part in the axial direction, and the stepped key has an inner collar projecting radially inwards, which is set against the end face of the rotor shaft and/or which delimits the rotor shaft counter to the axial direction. For example, the region covered by the stepped key in the axial direction overlaps with the region covered by the clutch part in the axial direction and overlaps with the region covered by the rotor shaft in the axial direction and/or overlaps with the region covered by the adapter shaft in the axial direction. For example, the rotor shaft has a keyway for accommodating the stepped key, and the keyway is stepped such that the inner collar is accommodated in the keyway, e.g., so that the inner collar is flush with the end face of the rotor shaft.

Thus, the stepped key provides for not only torque transmission, but also other aspects such as axial delimiting and/or securing. Thus, a plurality of aspects are integrated into the stepped key.

According to example embodiments, the geared motor has an electric motor and a transmission. A rotor shaft of the electric motor is rotationally fixed to a hub part, e.g., a clutch part, e.g., via a key connection. A stepped key connects the rotor shaft to the hub part in a form-fitting and/or rotationally fixed manner in the circumferential direction, the stepped key has an outer collar projecting radially outwards, which delimits the hub part in the axial direction, and the stepped key has an inner collar projecting radially inwards, which is set against the end face of the rotor shaft and/or which delimits the rotor shaft counter to the axial direction. For example, the region covered by the stepped key in the axial direction overlaps with the region covered by the hub part in the axial direction and overlaps with the region covered by the rotor shaft in the axial direction. For example, the rotor shaft has a keyway for accommodating the stepped key, and the keyway is stepped such that the inner collar is accommodated in the keyway, e.g., so that the inner collar is flush with the end face of the rotor shaft and/or so that the inner collar lies against the end face of the rotor shaft.

Thus, the stepped key provides for not only torque transmission, but also other aspects such as axial delimiting and/or securing. Thus, a plurality of aspects are integrated into the stepped parallel key, e.g., so that the geared motor can be configured to be compact overall. However, the stepped key is provided with a non-trivial geometry. The inner collar is spaced apart from the outer collar, e.g., in the axial direction. For example, the inner collar is arranged at the first axial end region, and the outer collar at the other axial end region of the stepped key.

According to example embodiments, in a method for producing an adapter from a modular system, in which the modular system has a first housing part, a second housing part, an intermediate flange, and a first bearing, either a first adapter or a second adapter is selectively produced. To produce the first adapter, the first housing part is directly connected to the second housing part, and the outer ring of the first bearing is accommodated in the first and second housing parts and centers the first housing part with respect to the second housing part. To produce the second adapter, the first housing part is connected directly to the intermediate flange, the intermediate flange is connected directly to the second housing part on the side thereof facing away from the first housing part, and the outer ring of the first bearing is accommodated in the first housing part and in the intermediate flange and centers the first housing part with respect to the intermediate flange. For example, the outer ring of the first bearing is axially delimited by a step of the first housing part and an outer ring of a freewheel, and the outer ring of the freewheel is set against a step of the intermediate flange on the side of the outer ring of the freewheel facing away from the outer ring of the first bearing.

Thus, a geared motor can be produced for different applications. For example, a geared motor formed with the first adapter can be arranged to be compact, and a geared motor formed with the second adapter can be provided with an additional feature, such as additional sealing or freewheel.

Further features and aspects of example embodiments of the present invention are explained in more detail below with reference to the appended schematic Figures.

DETAILED DESCRIPTION

Figure 1:
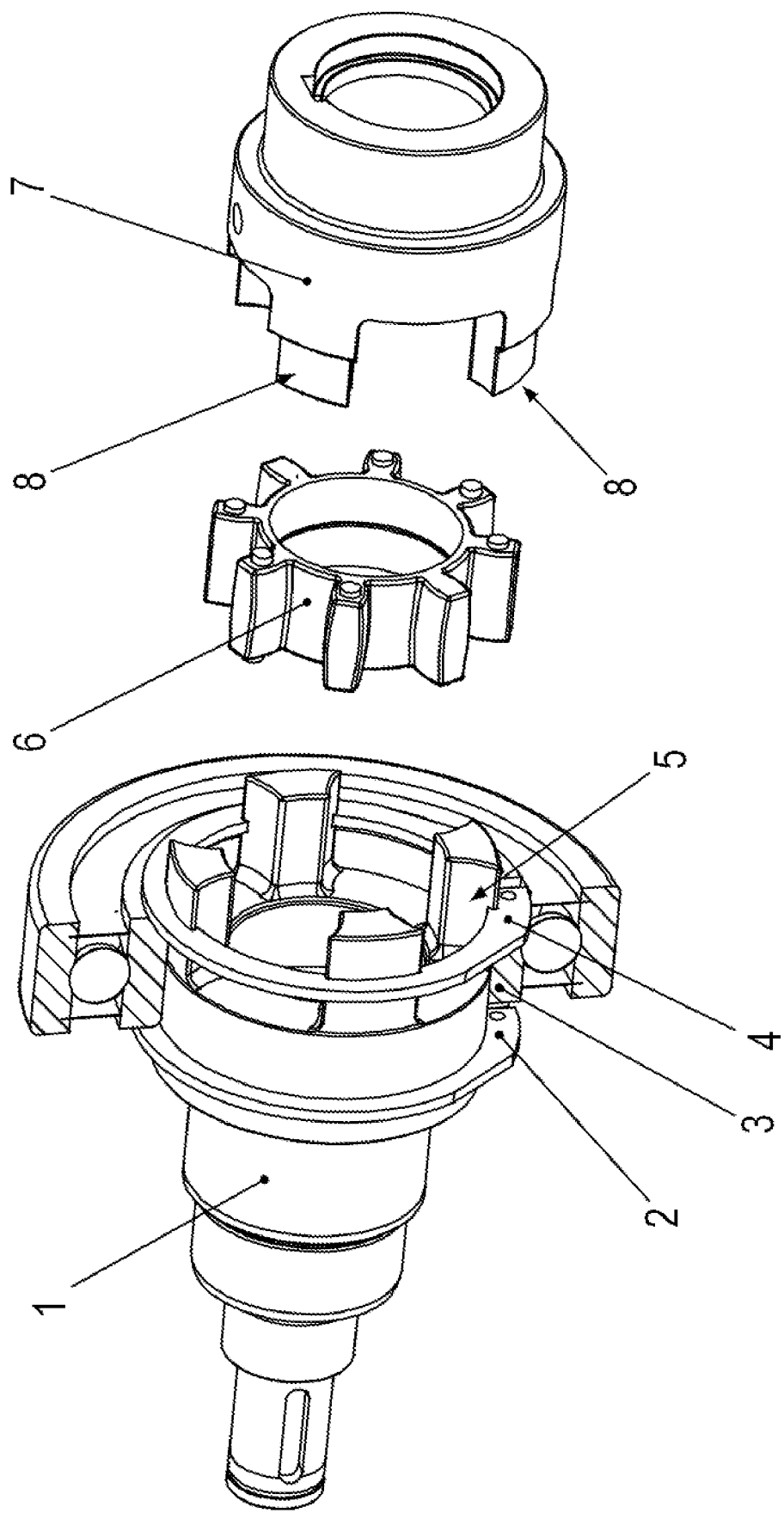
FIG. 1 is an exploded view of a dog clutch with the adapter shaft 1.

As illustrated in FIGS. 1 to 5, the adapter shaft 1 has dogs 5 at its axial end region facing the clutch part 7, which cover an axial region that overlaps with the axial region covered by dogs 8 of the clutch part 7.

The axial direction is parallel to the axis of rotation of the adapter shaft 1. The radial distances are relative to the axis of rotation of the adapter shaft 1.

A damping part 6 is shaped as a plastic star. For this purpose, the damping part 6 has an annular base body on which beam regions which project radially are formed.

The base body is arranged radially inside the dogs 5 and 8. The radial distance region covered by the beam regions in the radial direction includes or at least overlaps with the radial distance region covered by the dogs 5 of the adapter shaft 1 in the radial direction and with the radial distance region covered by the dogs 8 of the clutch part 7 in the radial direction.

The damping part 6, e.g., the beam regions, are arranged in the circumferential direction between the dogs 5 of the adapter shaft 1 and the dogs 8 of the clutch part 7.

The beam direction are spherical in the radial direction. Thus, the wall thickness of the respective beam region measured in the circumferential direction has a local maximum in the radial direction.

The region covered by the dogs 5 of the adapter shaft 1 in the axial direction overlaps with the region covered by the dogs 8 of the clutch part 7 in the axial direction.

The clutch part is fitted onto a rotor shaft 20, which projects through the clutch part 7 into a hollow region of the adapter shaft 1.

The rotor shaft 20 is rotationally fixed to the clutch part 7, e.g., via a key connection.

A bearing, which, e.g., is arranged as a fixed bearing, is fitted onto the adapter shaft 1.

For this purpose, the inner ring 3 of the bearing is fitted onto the adapter shaft 1 and axially delimited on both sides by two retaining rings 2, 4.

A first retaining ring 2 of the two retaining rings 2, 4 is provided in a first annular groove of the adapter shaft 1, in which this first annular groove is at a distance in the axial direction from the region covered by the dogs 5 of the adapter shaft 1 in the axial direction. This means that the first annular groove is completely uninterrupted in the circumferential direction.

The second retaining ring 2 of the two retaining rings 2, 4 is provided in a second annular groove of the adapter shaft 1, in which this second annular groove is arranged in the axial direction within the region covered by the dogs 5 of the adapter shaft 1 in the axial direction. This means that the second annular groove is interrupted at a plurality of points in the circumferential direction. The dogs 5 are spaced from each other in the circumferential direction, e.g., evenly spaced.

Since the inner ring 3 of the bearing is fitted onto the adapter shaft 1 and touches the adapter shaft 1 in the region located axially between the two retaining rings 2 and 4, the inner ring 3 is not supported in the regions between the dogs 5. The bearing seat thus is interrupted at a plurality of points in the circumferential direction.

The bearing seat on the adapter shaft 1 configured for accommodating the inner ring 3 thus covers a region in the axial direction which overlaps with the region covered by the dogs 5 of the adapter part 1 in the axial direction.

This means that the bearing seat is interrupted in a first region and uninterrupted in a further region.

The first region contributes 30% to 70% of the total axial width of the bearing seat. The further, i.e., uninterrupted, region contributes the remaining part.

However, a configuration in which the first region contributes less than half, i.e., less than 50%, of the total axial width of the bearing seat may be provided.

Figure 4:
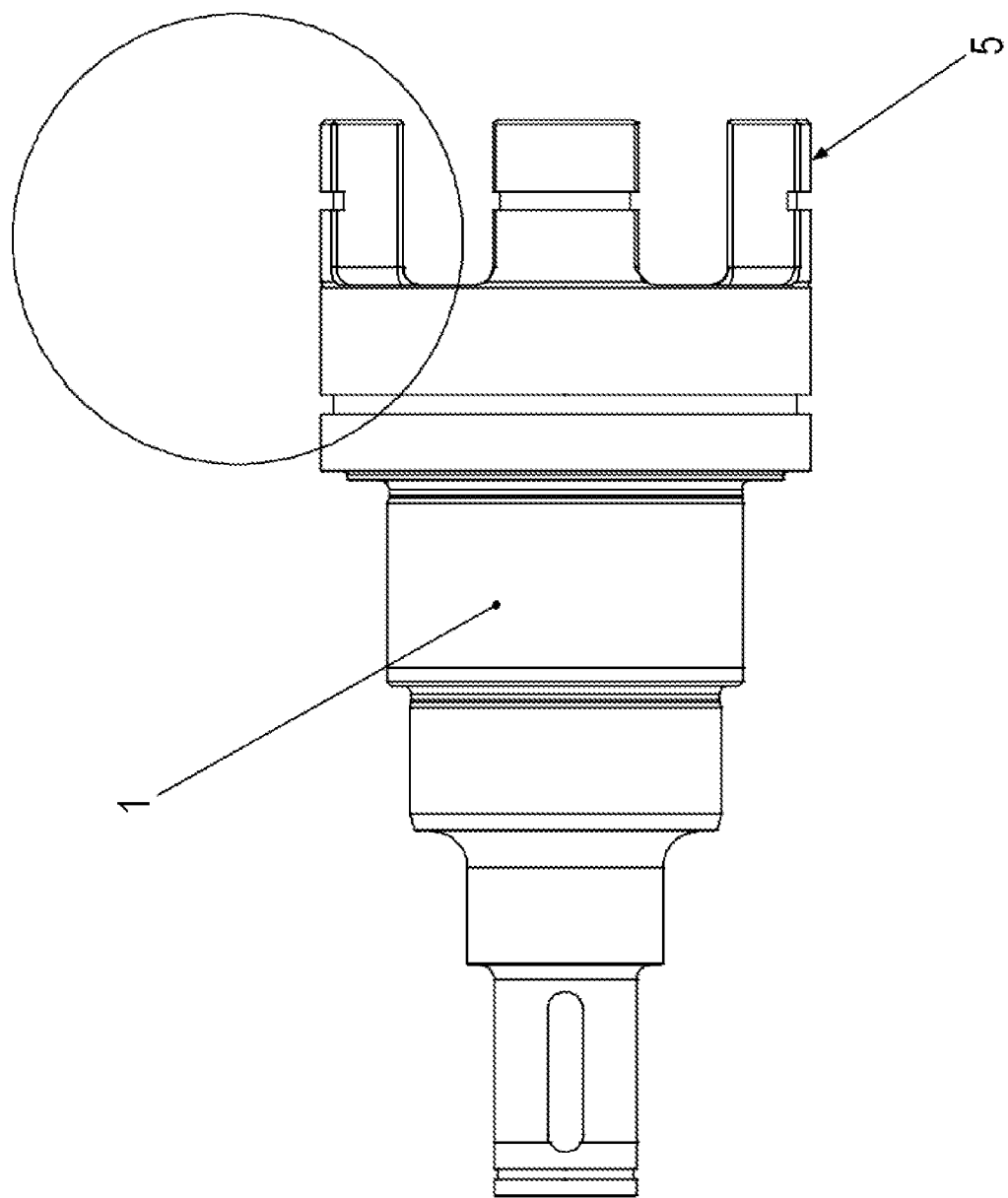
FIG. 4 is a side view of the adapter shaft 1.
Figure 5:
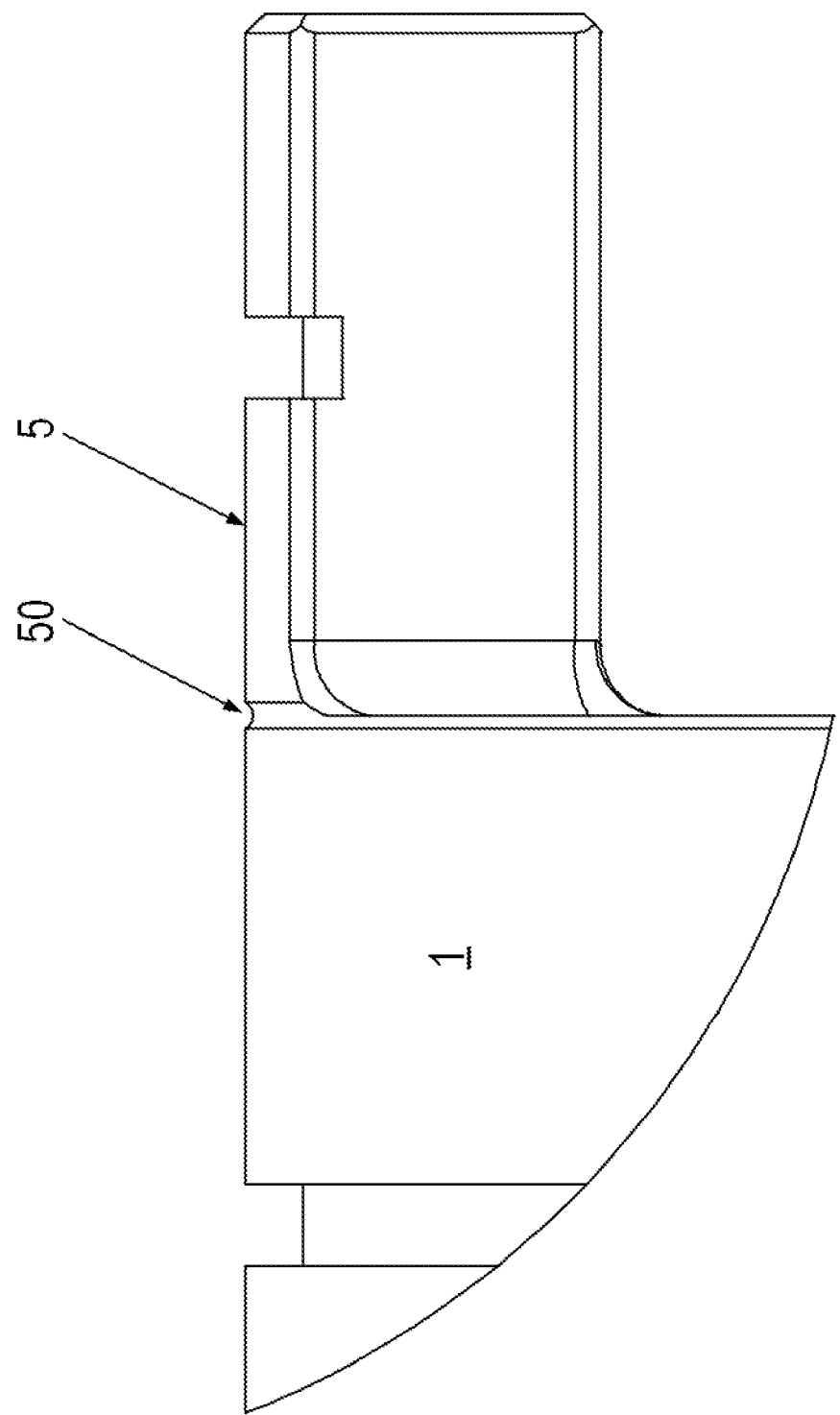
FIG. 5 illustrates an enlarged section of FIG. 4.

As illustrated, for example, in FIG. 5, which illustrates an enlarged region of FIG. 4, there is a cutout 50 on the adapter part 1, which cutout 50 is circumferential. For example, the cutout 50 is machined by turning, e.g., arranged as a recess.

This recess 50 is arranged in the axial transition region between the first and the further region. Thus, the cutout 50, e.g., the recess, is arranged at the edge of the region covered by the dogs 5 in the axial direction.

The cutout 50, e.g., the recess, thus delimits the region of the bearing seat interrupted in the circumferential direction from the remaining bearing seat, i.e., from the region of the bearing seat which is uninterrupted in the circumferential direction.

Thus, the cutout 50 is arranged in the axial direction between the first annular groove for the first retaining ring 2 and the second annular groove for the second retaining ring 4.

Figure 3:
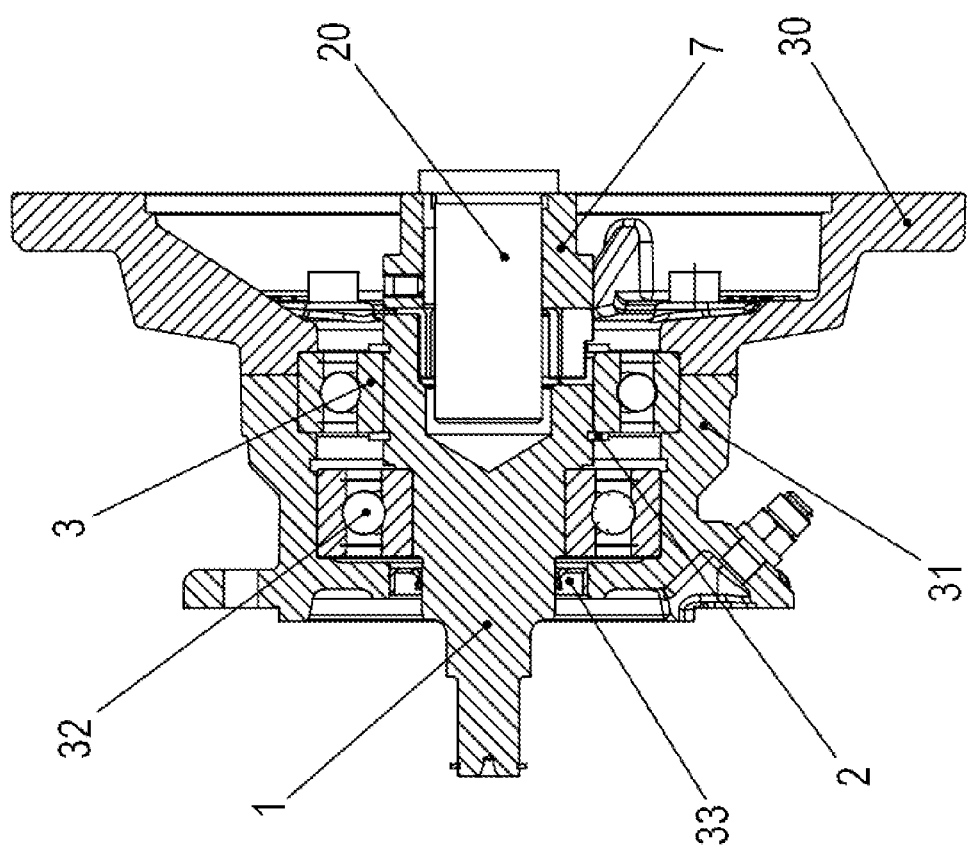
FIG. 3 is a cross-sectional view of an adapter.

As illustrated in FIG. 3, a second bearing is fitted onto the adapter shaft 1, which second bearing is accommodated in a second housing part 31 and is arranged as a non-locating bearing.

The second housing part 31 is connected to a first housing part 30, e.g., via screws.

Although the inner ring 3 of the first bearing partially has an interrupted bearing seat, as described above, the outer ring of this first bearing is partially accommodated in the first housing part 30 and partially in the second housing part 31.

Thus, the outer ring of the first bearing causes the centering of the first housing part 30 with respect to the second housing part 31. In addition, a shaft seal ring 33 which seals towards the adapter shaft 1 is accommodated in the first housing part 30. This means that the first housing part is connectable to a transmission housing whose interior is at least partially filled with oil.

The adapter shaft projects into the transmission and is rotationally fixed to a driving toothing part of the transmission.

For example, the outer diameter of the dogs 8 of the clutch part 7 is smaller than the clear inner diameter of the second retaining ring 4, which is accommodated in the annular groove of the adapter part 1, which annular groove is interrupted in the circumferential direction.

For example, the driving toothing part is provided in one piece, i.e., in one part, with the adapter shaft 1.

Figure 2:
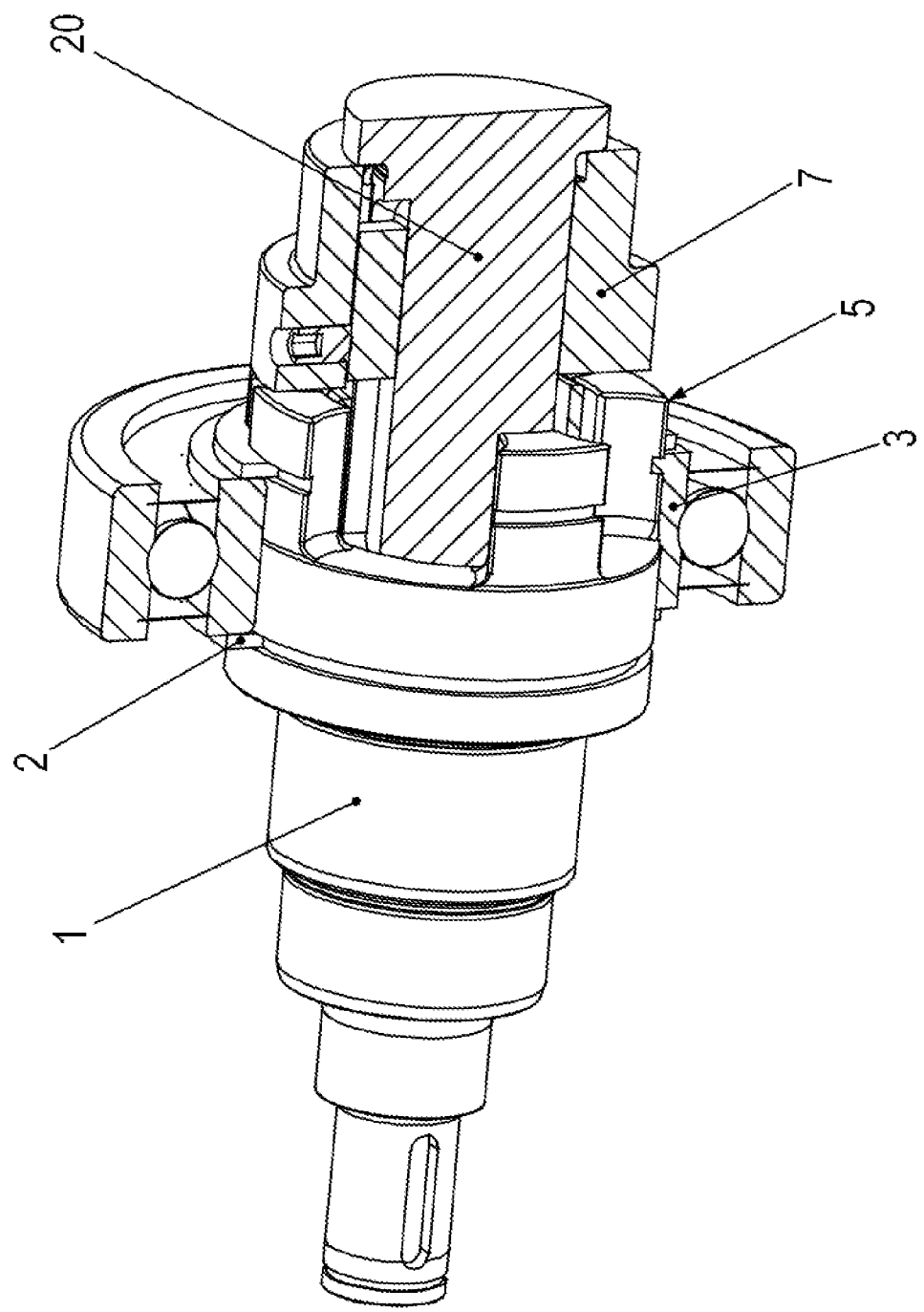
FIG. 2 is a cross-sectional view of the dog clutch.
Figure 6:
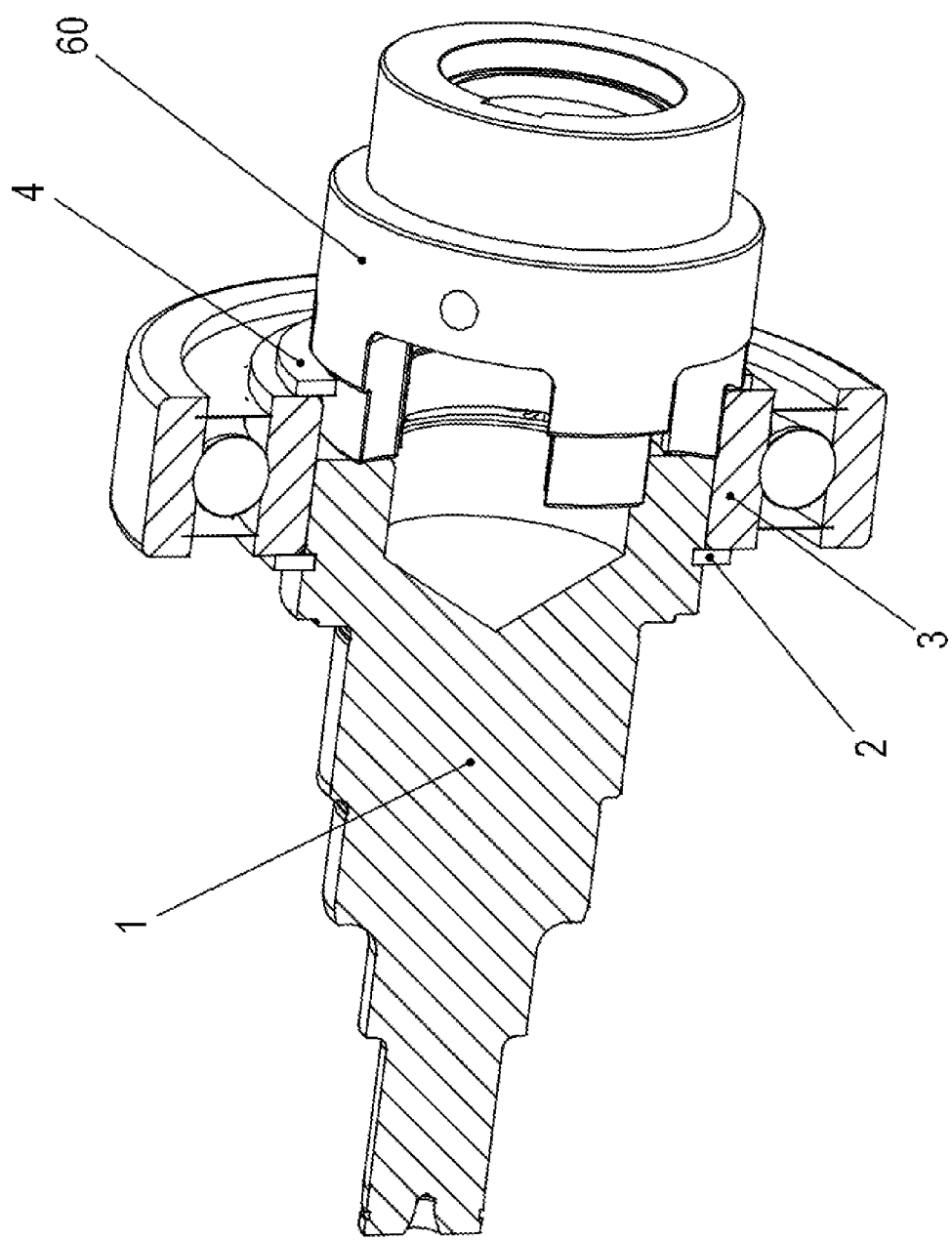
FIG. 6 is a perspective, cross-sectional view of a second dog clutch.

In the configuration illustrated in FIG. 6, unlike the configuration illustrated in FIG. 2, the dogs 5 of the adapter part do not project axially through the inner ring 3, but the inner ring 3 projects axially over the adapter part 1 towards the clutch part 60, the dogs 8 of which are also correspondingly shorter compared to FIG. 2.

The second retaining ring 4 is thus accommodated in an annular groove of the coupling part 60 and delimits the inner ring 3 accordingly.

In this manner, a particularly small axial width of the clutch is achievable, in which the inner ring 3 is delimited on the one side by the first retaining ring 2, which is accommodated in an annular groove of the adapter part 1, and on the other side by the second retaining ring 4, which is accommodated in an annular groove of the clutch part 60.

Figure 7:
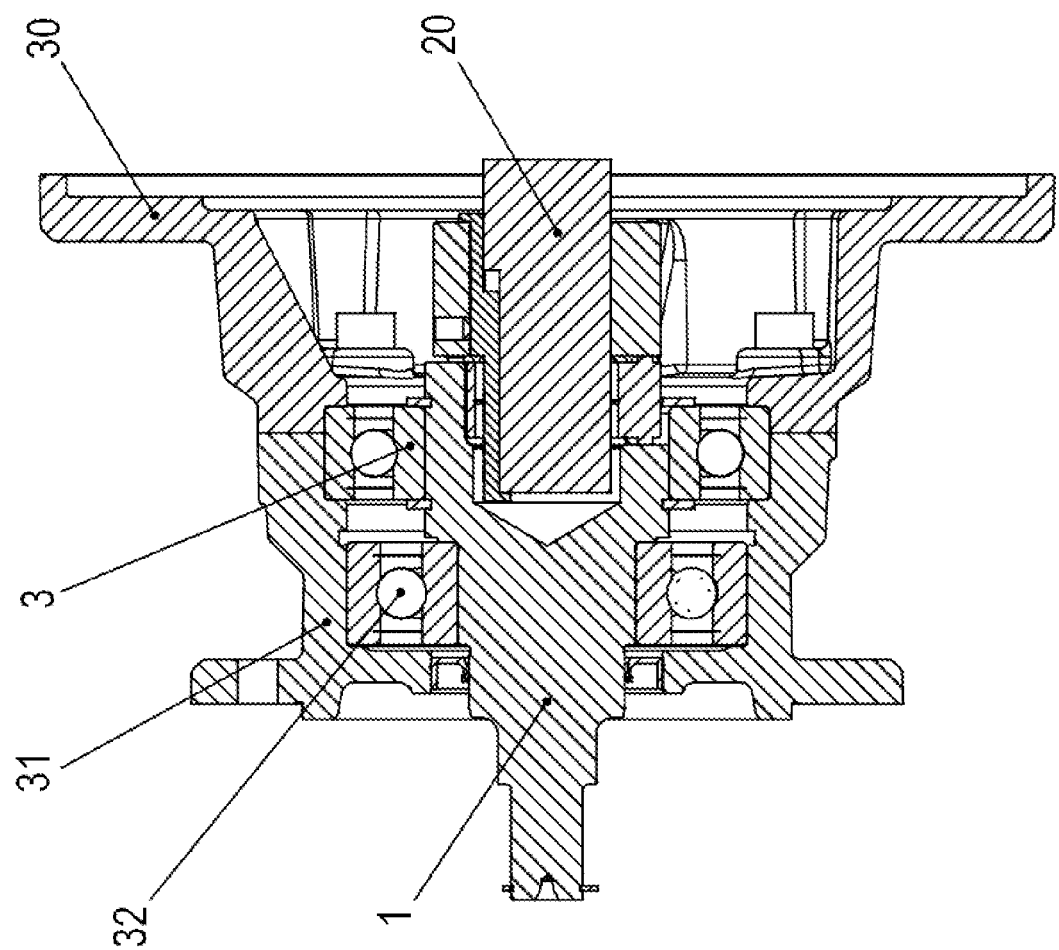
FIG. 7 is a cross-sectional view of another adapter that is similar to the adapter illustrated in FIG. 3.

As illustrated in FIG. 7, the outer ring of the first bearing is accommodated on the one hand in a bore of the first housing part 30 and on the other hand in a bore of the second housing part 31. The outer ring centers the two housing parts 30, 31 with respect to each other.

Figure 8:
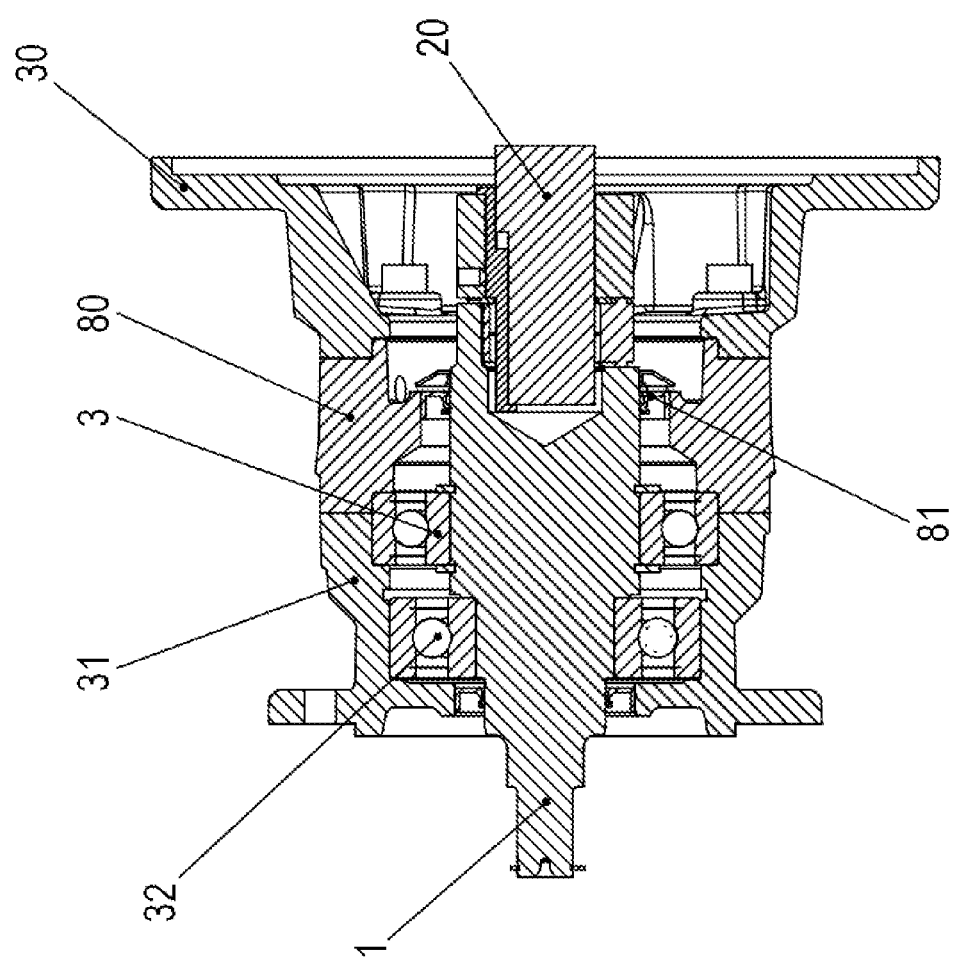
FIG. 8 is a cross-sectional view of another adapter, in which an intermediate flange 80 accommodating a shaft seal ring 81 is provided.

As illustrated in FIG. 8, in another configuration of the adapter, an intermediate flange 80 is arranged between the first housing part 30 and the second housing part 31, in which intermediate flange 80 a shaft seal ring 81 is accommodated, which seals towards the adapter shaft 1. The seal lip of the shaft seal ring 81 thus engages on a finely machined sealing surface of the adapter shaft 1.

In this configuration illustrated in FIG. 8, the outer ring of the first bearing centers the intermediate flange 80 towards the second housing part 31, since the outer ring is accommodated on the one hand in a bore of the intermediate flange 80, which is similar to the bore of the first housing part 30, and on the other hand in the bore of the second housing part 31.

The bore depth of the bore of the intermediate flange 80 for accommodating the outer ring is the same as the bore depth of the bore of the first housing part 30, which in the configuration illustrated in FIG. 7 is arranged as an accommodation for the outer ring.

In this manner, the intermediate flange 80 thus replaces the first housing part 30 for accommodating the outer ring of the first bearing.

The bores mentioned are arranged as blind bores and are clearly defined by their diameter and bore depth.

In this manner, the intermediate flange 80 is thus configured identically towards the second housing part 31 as the first housing part 30 is configured towards the second housing part 31.

The intermediate flange 80 on the side thereof facing away from the second housing part 31 has an axially projecting centering collar, the outer diameter of which is equal to the outer diameter of the outer ring of the first bearing and the axial extension of which is equal to the bore depth of that bore of the first housing part 30 which is provided for accommodating the outer ring of the first bearing in the configuration illustrated in FIG. 7.

Thus, the intermediate flange 80 is configured towards the first housing part 31 identically to the manner in which an intended part is configured towards the first housing part 31, the intended part including the second housing part 30 and the outer ring of the first bearing according to the configuration illustrated in FIG. 7, in which the radial wall thickness of the centering collar may be less than the radial wall thickness of the outer ring.

Figure 9:
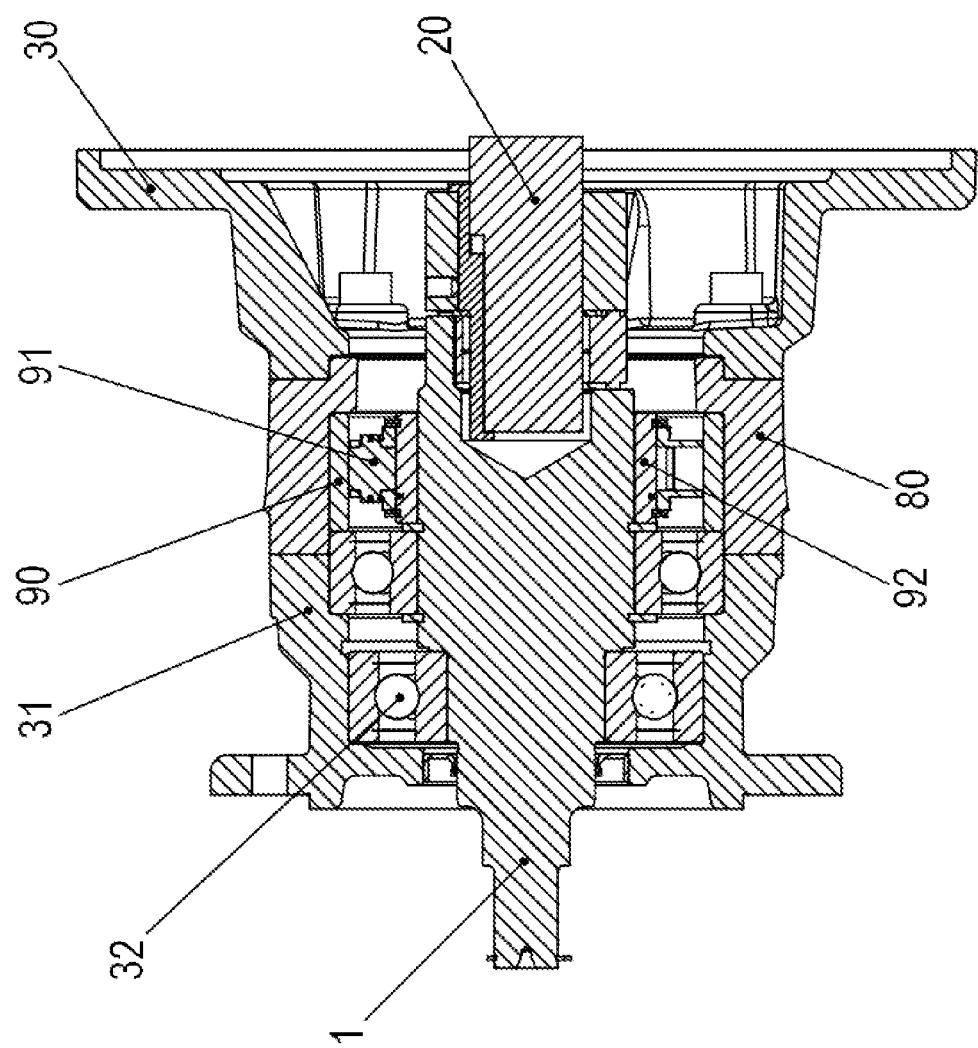
FIG. 9 is a cross-sectional view of another adapter, in which an intermediate flange 80 accommodating a freewheel is provided.

As illustrated in FIG. 9, instead of the shaft seal ring 81, a freewheel, e.g., a clamping body freewheel, can be accommodated, which has an inner ring 92 and an outer ring 90 as well as other components, such as clamping bodies 91.

The outer ring 90 of the freewheel is set against a step of the intermediate flange 80, and the outer ring of the first bearing lies against the outer ring 90 of the freewheel and is thus set against this outer ring 90. For this purpose, the bore depth of the bore hole facing the second housing part 31 is extended by the axial length of the outer ring 90 of the freewheel.

As illustrated in FIGS. 7 to 9, there is a key connection between the rotor shaft 20 and the clutch part 7. The key is arranged as a stepped key, i.e., it has a monotonically increasing maximum radial distance from the axis of rotation of the rotor shaft 20 in the axial direction.

Thus, the clutch part 7 can be set axially against a step of the key and in this manner is positioned axially on the rotor shaft 20.

Nevertheless, the first housing part 30 has four through bores 100 spaced apart from each other in the circumferential direction, e.g., spaced apart evenly.

Figure 10:
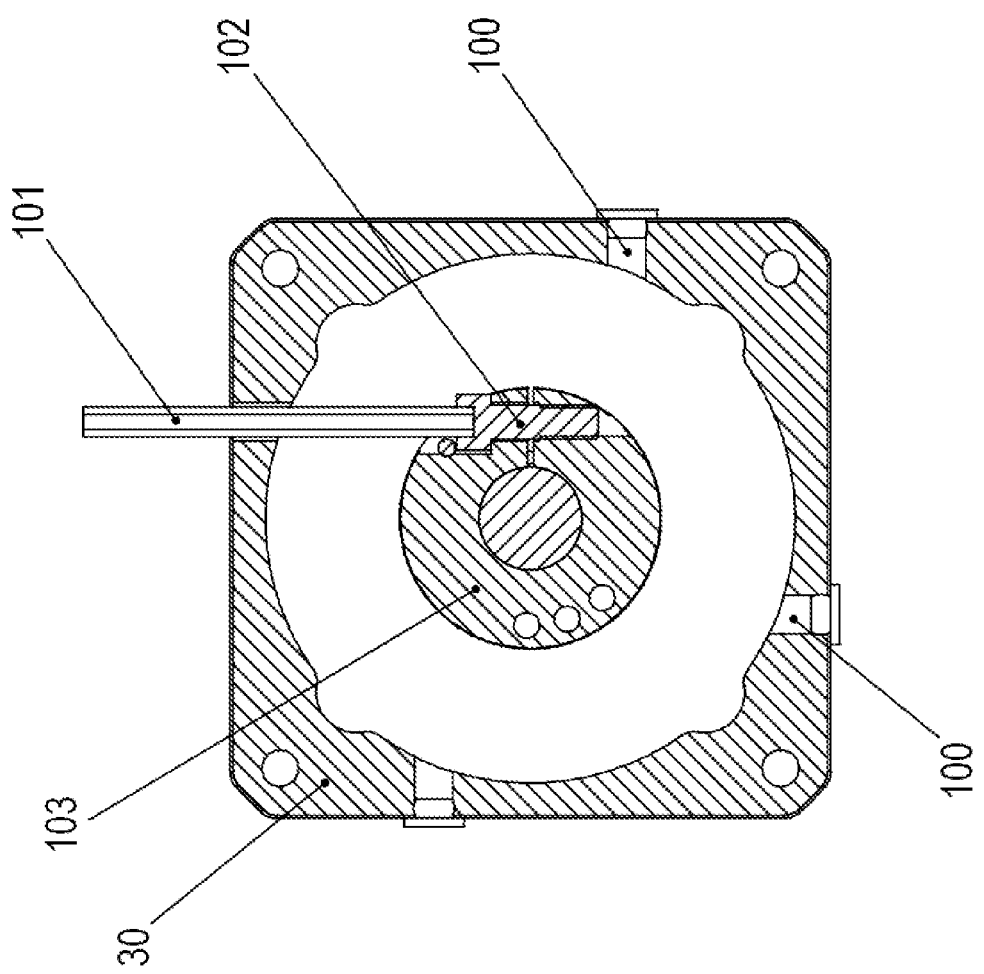
FIG. 10 illustrates the actuation of a clamping connection for creating a force-locking connection as an alternative to the key connection of the rotor shaft 20 to the clutch part 7.

As illustrated in FIG. 10, instead of the key connection, the rotor shaft 20 can be connected in a force-locking manner to the clutch part 7 via a clamping ring 103. A tool can be inserted through one of the four through bores 100 to actuate the clamping screw 102 of the clamping connection. For example, the screw axis of the clamping screw 102 is in alignment with the through bore, e.g., with the bore axis of the through bore 100, at an angular position of the rotor shaft 20.

All through bores 100 are closed during operation via a sealing plug inserted into the respective through bore 100.

Since the second housing part 30 is identical in all adapters, the second housing part 30 also has the through bores 100 in the adapter configuration having a dog clutch, which through bores 100 are sealed with sealing plugs. Thus, only a few housing parts need to be stocked to form a series of adapters.

For example, the dog region of the adapter shaft 1 extends so far in the axial direction that the inner ring of the freewheel is pushed onto the dog region, i.e., the seat for the inner ring of the freewheel is interrupted. As illustrated in FIG. 3, the inner ring 2 of the first bearing is partially interrupted and partially uninterrupted in the circumferential direction because the inner ring 2 of the first bearing axially overlaps with the dog region, i.e., with the region covered by the dogs 5 of the adapter shaft 1 in the axial direction.

Figure 11:
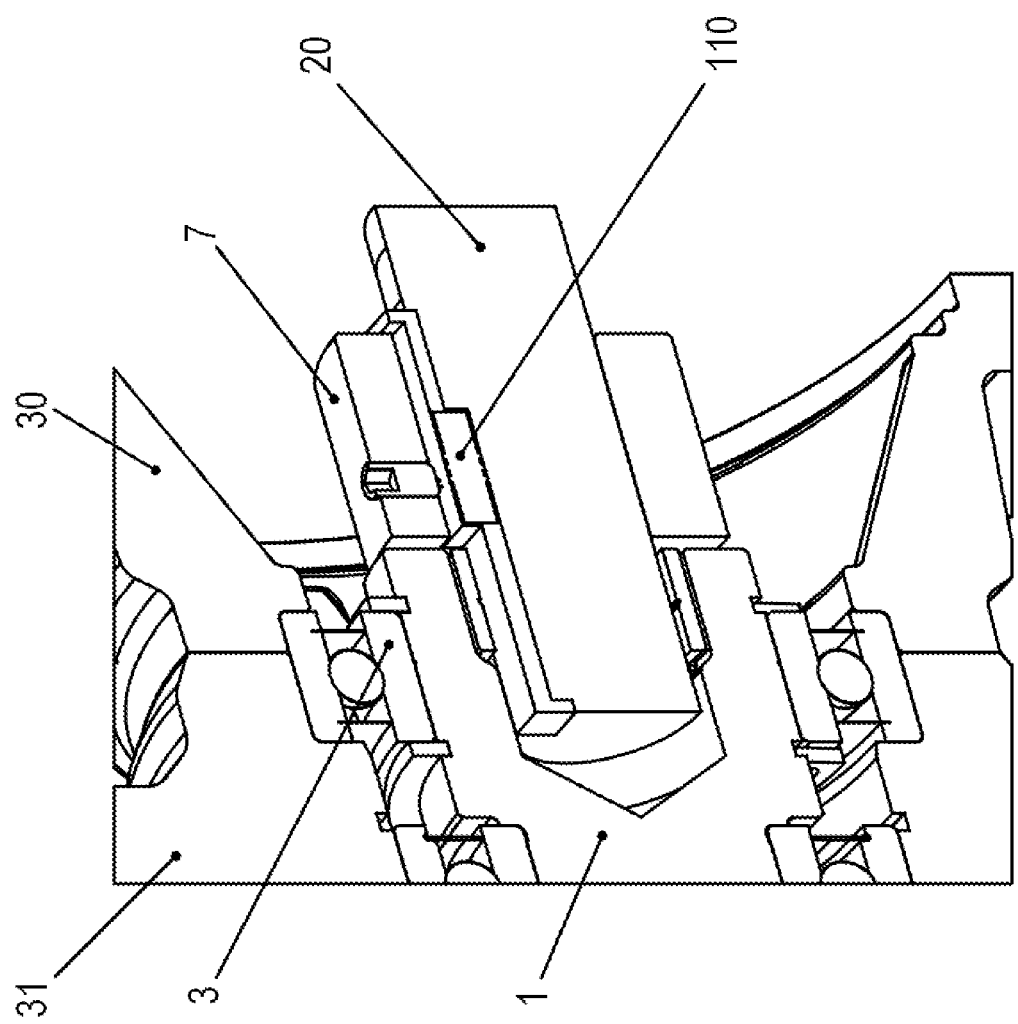
FIG. 11 is a cross-sectional view of the connection region effected by a stepped key 110 for creating a form-locking connection of the clutch part 7 to the rotor shaft 20.
Figure 12:
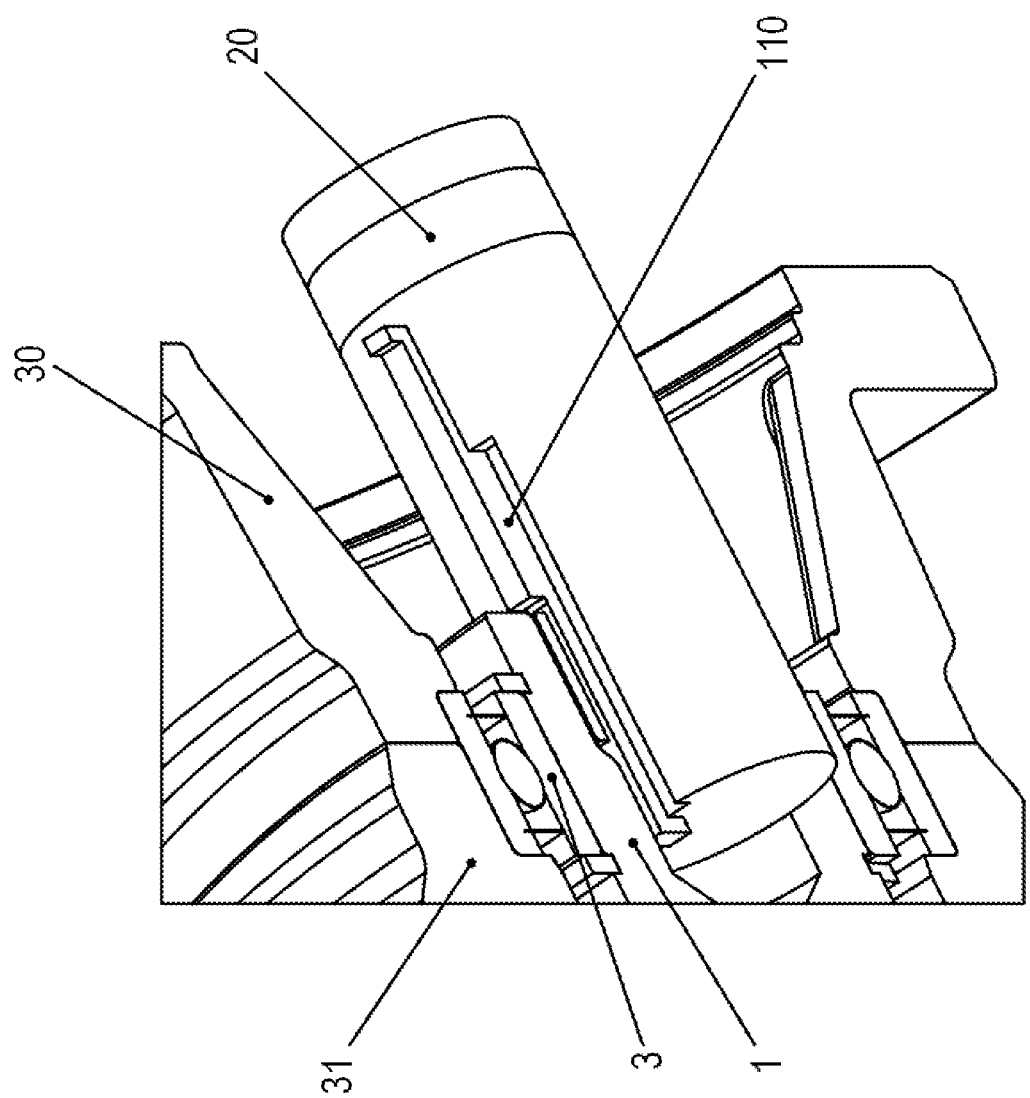
FIG. 12 is a perspective view of a section of the connection region.
Figure 13:
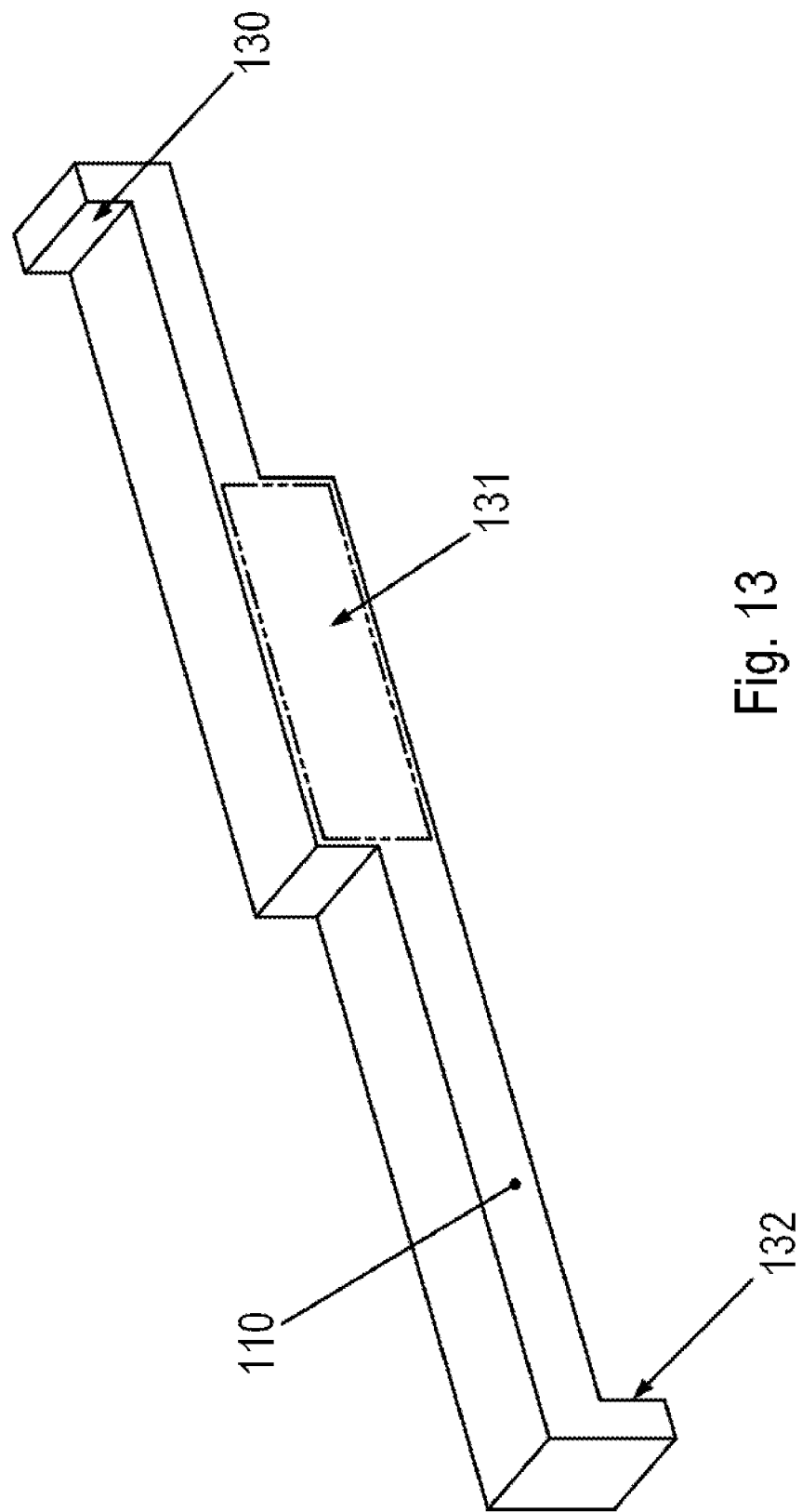
FIG. 13 is a perspective view of the stepped key 110.

As illustrated in FIGS. 11 to 13, the stepped key 110 is provided with an outer collar 130 projecting radially outwards for axial positioning of the clutch part 7 and an inner collar 132 projecting radially inwards as a stop surface for the end face of the rotor shaft 20.

The torque-transmitting region 131 is directed in the circumferential direction, i.e., arranged as a flat side surface of the stepped key 110, in which the normal direction of the side surface is aligned tangentially.

The radial distance region covered by the stepped key 110 overlaps both with the radial distance region covered by the rotor shaft 20 and with the radial distance region covered by the clutch part 7.

The stepped key 110 thus projects both into a keyway of the rotor shaft 20 and into a keyway of the clutch part 7.

Since the clutch part 7 is axially delimited by the outer collar 130 in that the clutch part 7, when set against the outer collar 130, presses the stepped key 110 in the axial direction and thus presses the inner collar 132 against the end face of the rotor shaft 20, the axial degree of freedom of movement of the clutch part 7 is limited such that the dogs 5, 8 cannot be axially moved away from each other. Thus, the torque transmission, e.g., of the dogs 5, 8, is ensured by the stepped key 110.

In the region covered by the torque-transmitting region 131 in the axial direction, the stepped key 110 has the greatest radial extension, e.g., the greatest radial wall thickness. Thus, a large torque can be transmitted through the stepped key 110. Only small forces are required for the axial positioning of the clutch part 7.

The keyway of the rotor shaft 20 is stepped such that the inner collar 132 is recessed flush at the end face. Alternatively, the keyway opens into the surrounding area in the axial end region without a step, so that the inner collar 132 lies against the end face of the rotor shaft 20 from the outside.

LIST OF REFERENCE NUMERALS

1 Adapter shaft
2 Retaining ring
3 Inner ring of the fixed bearing
4 Retaining ring
5 Dogs
6 Damping part
7 Clutch part, e.g., clutch hub
8 Dogs
20 Rotor shaft
30 First housing part
31 Second housing part
32 Non-locating bearing
33 Shaft seal ring
50 Cutout, circumferential recess
60 Clutch part
80 Intermediate flange
81 Shaft seal ring
90 Outer ring
91 Clamping body
92 Inner ring
100 Through bore
101 Tool
102 Clamping screw
103 Clamping ring
110 Stepped key
130 Outer collar for axial positioning of the clutch part 7
131 Torque-transmitting region
132 Inner collar as a stop surface for the end face of the rotor shaft 20

The invention claimed is:

1. An adapter system series for geared motors, comprising:
   a first adapter including a first adapter shaft, a first bearing, and a housing having a first housing part and a second housing part, the first housing part being connected to the second housing part, an inner ring of the first bearing being arranged the first adapter shaft, an outer ring of the first bearing being accommodated in the first housing part and the second housing part and centering the first housing part with respect to the second housing part; and
   a second adapter including a second adapter shaft, a first bearing identical to the first bearing of the first adapter, and a second housing having a first housing part identical to the first housing part of the first adapter, a second housing part identical to the second housing part of the first adapter, and an intermediate flange, the first housing part of the second adapter being connected to the intermediate flange, the intermediate flange being connected on a side thereof facing away from the first housing part of the second adapter to the second housing part of the second adapter, an inner ring of the first bearing of the second adapter being arranged on the second adapter shaft, an outer ring of the first bearing of the second adapter being accommodated in the first housing part of the second adapter and in the intermediate flange and centering the first housing part of the second adapter with respect to the intermediate flange, a shaft seal ring or a freewheel being accommodated in the intermediate flange or integrated in the intermediate flange.

2. The adapter system according to claim 1, wherein each second housing part includes through bores spaced apart from each other in a circumferential direction.

3. The adapter system according to claim 2, wherein the through bores are all arranged at a same axial position, each through bore closed with a respective sealing plug, at a respective angular position of the second adapter shaft, a bore axis of each through bore is alignable with a screw axis of a clamping screw of a clamping ring of the first adapter or the second adapter, the clamping ring adapted to connected to the first adapter shaft or the second adapter shaft in a rotationally fixed manner.

4. The adapter system according to claim 1, wherein, in the first adapter, the outer ring of the first bearing is accommodated in a bore of the first housing part and in a bore of the second housing part, a sum of bore depths of the two bores equaling an axial length of the outer ring; and
   wherein in the second adapter, the outer ring of the first bearing is accommodated on in a bore of the first housing part and in a bore of the intermediate flange, a sum of bore depths of the two bores, in the second adapter, equaling an axial length of the outer ring or equals a sum of the axial length of the outer ring of the first bearing and of an outer ring of the freewheel.

5. The adapter system according to claim 1, wherein the first adapter includes a clutch part, the first adapter shaft has dogs, the inner ring of the first bearing is arranged on a bearing seat provided on the first adapter shaft, the bearing seat covers, in an axial direction, a first region in which the bearing seat is uninterrupted in a circumferential direction, and a second region in which the bearing seat is interrupted in the circumferential direction.

6. The adapter system according to claim 5, wherein a damping part is arranged between dogs of the clutch part and the dogs of the first adapter shaft.

7. The adapter system according to claim 6, wherein the damping part includes a base body and beam regions formed on the base body that project in a radial direction, the beam regions being arranged axially between dogs of the clutch part and of the adapter part.

8. The adapter system according to claim 5, wherein a circumferential cutout is arranged on the adapter shaft in an axial direction between the first region and the second region.

9. The adapter system according to claim 5, wherein a region covered by the dogs in an axial direction includes the first region and is at a distance from the second region in the axial direction, the axial direction being aligned parallel to an axis of rotation of the adapter shaft.

10. The adapter system according to claim 5, wherein a first retaining ring is accommodated in a first annular groove of the adapter shaft and delimits the inner ring, the first annular groove being spaced apart from the first region and/or from the dogs in an axial direction.

11. The adapter system according to claim 1, wherein the inner ring is axially delimited on both sides by retaining rings.

12. The adapter system according to claim 1, wherein a second retaining ring delimits the inner ring and is accommodated in a second annular groove.

13. The adapter system according to claim 12, wherein the second annular groove is interrupted in a circumferential direction.

14. The adapter system according to claim 12, wherein the second annular groove is arranged in dogs of the first or second adapter part and/or in dogs of a clutch part.

15. The adapter system according to claim 12, wherein the second annular groove is uninterrupted in a circumferential direction and is arranged in a clutch part.

16. The adapter system according to claim 1, wherein the first bearing is arranged as a fixed bearing.

17. The adapter system according to claim 1, wherein at least one of the adapters includes a second bearing, an outer ring of the second bearing being accommodated in the first housing part and an inner ring of the second bearing being arranged on the respective the adapter shaft.

18. The adapter system according to claim 17, wherein a shaft seal ring is arranged in the first housing part and seals toward the first or second adapter shaft.

19. A geared motor, comprising:
   a transmission including a driving toothing part;
      (i) a first adapter including a first adapter shaft rotationally fixed or integral to the driving toothing part, a first bearing, and a housing having a first housing part and a second housing part, the first housing part being connected to the second housing part, an inner ring of the first bearing being arranged the first adapter shaft, an outer ring of the first bearing being accommodated in the first housing part and the second housing part and centering the first housing part with respect to the second housing part; or
      (ii) a second adapter including a second adapter shaft rotationally fixed or integral to the driving toothing part, a first bearing identical to the first bearing of the first adapter, and a second housing having a first housing part identical to the first housing part of the first adapter, a second housing part identical to the second housing part of the first adapter, and an intermediate flange, the first housing part of the second adapter being connected to the intermediate flange, the intermediate flange being connected on a side thereof facing away from the first housing part of the second adapter to the second housing part of the second adapter, an inner ring of the first bearing of the second adapter being arranged on the second adapter shaft, an outer ring of the first bearing of the second adapter being accommodated in the first housing part of the second adapter and in the intermediate flange and centering the first housing part of the second adapter with respect to the intermediate flange, a shaft seal ring or a freewheel being accommodated in the intermediate flange or integrated in the intermediate flange; and an electric motor;

wherein a rotor shaft is rotationally fixed to a clutch part; and wherein a stepped key connects the rotor shaft to the clutch part in a form-fitting and/or rotationally fixed manner in a circumferential direction, the stepped key including an outer collar projecting radially outwards that delimits the clutch part in an axial direction, the stepped key including an inner collar projecting radially inwards set against an end face of the rotor shaft and/or delimiting the rotor shaft counter to the axial direction, a region covered by the stepped key in the axial direction overlapping with a region covered by the clutch part in the axial direction and overlapping with a region covered by the rotor shaft in the axial direction and/or overlapping with a region covered by the adapter shaft in the axial direction, the rotor shaft including a keyway adapted to accommodate the stepped key, the keyway being stepped such that the inner collar is accommodated in the keyway and/or such that the inner collar is flush with the end face of the rotor shaft.

20. A geared motor, comprising
an adapter having an adapter shaft, a first bearing, a first housing part, dogs, and a clutch part;
an electric motor having a second housing part; and
a transmission;
wherein the first housing part is connected and/or directly connected to the second housing part;
wherein an inner ring of the first bearing is arranged on a bearing seat of the adapter shaft;
wherein an outer ring of the first bearing is accommodated in the first housing part and second housing part and centers the first housing part with respect to the second housing part;
wherein the bearing seat covers, in an axial direction, a first region in which the bearing seat is uninterrupted in a circumferential direction, and a second region in which the bearing seat is interrupted in the circumferential direction;
wherein a rotor shaft is rotationally fixed to the clutch part; and
wherein the adapter shaft is rotationally fixed and/or integral to a driving toothing part of the transmission; and
wherein a stepped key connects the rotor shaft to the clutch part in a rotationally fixed manner in the circumferential direction, the stepped key including an outer collar projecting radially outwards delimiting the clutch part in the axial direction, the stepped key including an inner collar projecting radially inwards set against an end face of the rotor shaft, a region covered by the stepped key in the axial direction overlapping with a region covered by the clutch part in the axial direction and overlapping with a region covered by the rotor shaft in the axial direction and/or overlapping with a region covered by the adapter shaft in the axial direction, the rotor shaft including a keyway adapted to accommodate the stepped key, the keyway being stepped such that the inner collar is accommodated in the keyway.

21. The geared motor according to claim 20, wherein the inner collar is flush with the end face of the rotor shaft.

22. A geared motor, comprising:
(i) a first adapter including a first adapter shaft rotationally fixed or integral to the driving toothing part, a first bearing, and a housing having a first housing part and a second housing part, the first housing part being connected to the second housing part, an inner ring of the first bearing being arranged the first adapter shaft, an outer ring of the first bearing being accommodated in the first housing part and the second housing part and centering the first housing part with respect to the second housing part; or
(ii) a second adapter including a second adapter shaft rotationally fixed or integral to the driving toothing part, a first bearing identical to the first bearing of the first adapter, and a second housing having a first housing part identical to the first housing part of the first adapter, a second housing part identical to the second housing part of the first adapter, and an intermediate flange, the first housing part of the second adapter being connected to the intermediate flange, the intermediate flange being connected on a side thereof facing away from the first housing part of the second adapter to the second housing part of the second adapter, an inner ring of the first bearing of the second adapter being arranged on the second adapter shaft, an outer ring of the first bearing of the second adapter being accommodated in the first housing part of the second adapter and in the intermediate flange and centering the first housing part of the second adapter with respect to the intermediate flange, a shaft seal ring or a freewheel being accommodated in the intermediate flange or integrated in the intermediate flange;
an electric motor; and
a transmission;
wherein a rotor shaft of the electric motor is rotationally fixed to a hub part;
wherein a stepped key connects the rotor shaft to the hub part in a form-fitting and/or rotationally fixed manner in a circumferential direction;
wherein the stepped key includes an outer collar projecting radially outwards delimiting the hub part in an axial direction, the stepped key including an inner collar projecting radially inwards set against an end face of the rotor shaft and/or delimiting the rotor shaft counter to the axial direction.

23. The geared motor according to claim 22, wherein a region covered by the stepped key in the axial direction overlapping with a region covered by the hub part in the axial direction and overlapping with a region covered by the rotor shaft in the axial direction, the rotor shaft including a keyway adapted to accommodate the stepped key, the keyway is stepped such that the inner collar is accommodated in the keyway, such that the inner collar is flush with the end face of the rotor shaft, and/or such that the inner collar lies against the end face of the rotor shaft.

24. A method for producing the first adapter and the second adapter of the adapter system as recited in claim 1 from a modular system that includes the first housing part, the second housing part, the intermediate flange, and the first bearing, comprising:

producing the first adapter by directly connecting the first housing part to the second housing part, accommodating the outer ring of the first bearing in the first housing part and in the second housing parts, and centering the first housing part with respect to the second housing part; and producing the second adapter by directly connecting the first housing part to the intermediate flange, directly connecting the intermediate flange to the second housing part on a side facing away from the first housing part, accommodating the outer ring of the first bearing in the first housing part and in the intermediate flange, and centering the first housing part with respect to the intermediate flange.

25. The method according to claim 24, wherein, in the second adapter, the outer ring of the first bearing is axially delimited by a step of the first housing part and an outer ring of the freewheel, and the outer ring of the freewheel is set against a step of the intermediate flange on the side of the outer ring of the freewheel facing away from the outer ring of the first bearing.

26. A geared motor, comprising:
a transmission including a driving toothing part;
an adapter including an adapter shaft rotationally fixed or integral to the driving toothing part, a first bearing, and a housing having a first housing part, a second housing part, and an intermediate flange, the first housing part being connected to the intermediate flange, the intermediate flange being connected on a side thereof facing away from the first housing part to the second housing part, an inner ring of the first bearing being arranged on the adapter shaft, an outer ring of the first bearing being accommodated in the first housing part and in the intermediate flange and centering the first housing part with respect to the intermediate flange, a shaft seal ring or a freewheel being accommodated in the intermediate flange or integrated in the intermediate flange; and
an electric motor;
wherein a rotor shaft is rotationally fixed to a clutch part.

27. The geared motor according to claim 26, wherein a stepped key connects the rotor shaft to the clutch part in a form-fitting and/or rotationally fixed manner in a circumferential direction, the stepped key including an outer collar projecting radially outwards that delimits the clutch part in an axial direction, the stepped key including an inner collar projecting radially inwards set against an end face of the rotor shaft and/or delimiting the rotor shaft counter to the axial direction, a region covered by the stepped key in the axial direction overlapping with a region covered by the clutch part in the axial direction and overlapping with a region covered by the rotor shaft in the axial direction and/or overlapping with a region covered by the adapter shaft in the axial direction, the rotor shaft including a keyway adapted to accommodate the stepped key, the keyway being stepped such that the inner collar is accommodated in the keyway and/or such that the inner collar is flush with the end face of the rotor shaft.

* * * * *